(12) United States Patent
Pirlo

(10) Patent No.: US 12,460,320 B2
(45) Date of Patent: Nov. 4, 2025

(54) CREATING DEFINED ELECTROSPUN FIBER GEOMETRIES

(71) Applicant: University of Dayton Research Institute, Dayton, OH (US)

(72) Inventor: Russell Kirk Pirlo, Oakwood, OH (US)

( * ) Notice: Subject to any disclaimer, the term of this patent is extended or adjusted under 35 U.S.C. 154(b) by 0 days.

(21) Appl. No.: 18/502,191

(22) Filed: Nov. 6, 2023

(65) Prior Publication Data

US 2024/0068130 A1  Feb. 29, 2024

Related U.S. Application Data

(62) Division of application No. 17/327,849, filed on May 24, 2021, now Pat. No. 11,807,957.

(60) Provisional application No. 63/028,645, filed on May 22, 2020.

(51) Int. Cl.
| | | |
|---|---|---|
| *D01D 5/00* | (2006.01) | |
| *D01D 5/08* | (2006.01) | |
| *B33Y 10/00* | (2015.01) | |

(52) U.S. Cl.
CPC ......... *D01D 5/0069* (2013.01); *D01D 5/0076* (2013.01); *D01D 5/0092* (2013.01); *D01D 5/08* (2013.01); *B33Y 10/00* (2014.12)

(58) Field of Classification Search
CPC ..... B29C 64/10; B29C 64/106; B29C 64/118; D01D 5/08; D01D 5/0092; D01D 5/0076; D01D 5/0069

See application file for complete search history.

(56) References Cited

U.S. PATENT DOCUMENTS

| | | | | |
|---|---|---|---|---|
| 7,572,403 | B2 * | 8/2009 | Gu | B29C 64/165 |
| | | | | 700/118 |
| 10,259,007 | B2 * | 4/2019 | Leschkies | B05B 5/04 |
| 2011/0233342 | A1 * | 9/2011 | Marissen | B32B 3/16 |
| | | | | 428/221 |
| 2015/0054201 | A1 * | 2/2015 | Kim | B33Y 10/00 |
| | | | | 264/452 |
| 2018/0207863 | A1 * | 7/2018 | Porter | B29C 64/40 |
| 2019/0198310 | A1 * | 6/2019 | Pajuelo | H01J 65/042 |
| 2019/0333695 | A1 * | 10/2019 | Dardona | H01F 41/0253 |
| 2020/0047401 | A1 * | 2/2020 | Yu | A61L 27/20 |

(Continued)

FOREIGN PATENT DOCUMENTS

| | | | | | |
|---|---|---|---|---|---|
| CN | 109866421 | A | * | 6/2019 | ........... B29C 64/129 |
| CN | 209320308 | U | * | 8/2019 | ........... B29C 64/135 |

(Continued)

*Primary Examiner* — Emmanuel S Luk
(74) *Attorney, Agent, or Firm* — Thomas E. Lees, LLC

(57) ABSTRACT

An object is built by depositing a mat on a build surface and utilizing a manufacturing process to position a structure over at least a portion of the mat to define an object. The object is removed from the build surface such that a first portion of the mat removed with the object is bonded to the structure, and a second portion of the mat removed with the object is unsupported by the structure. Alternatively, an object can be built by printing a conductive material over a surface to define a structure and utilizing the conductive material as a collector to control an electric field deposition over the structure to define an object where a first portion of the deposition is bonded to the structure and a second portion of the deposition is unsupported by the structure.

17 Claims, 8 Drawing Sheets

(56) References Cited

U.S. PATENT DOCUMENTS

| | | | | |
|---|---|---|---|---|
| 2020/0163752 A1* | 5/2020 | Salas | ............... | A61F 2/3094 |
| 2022/0166020 A1* | 5/2022 | Yonemaru | ............ | H01G 11/06 |
| 2022/0181703 A1* | 6/2022 | Ishiguro | ............ | D01D 5/0084 |
| 2022/0372656 A1* | 11/2022 | Bittner | ............... | D01D 5/0061 |
| 2023/0009276 A1* | 1/2023 | Lobmann | ............ | A61K 9/1658 |
| 2023/0024512 A1* | 1/2023 | Qiang | ............... | B33Y 70/00 |
| 2023/0080204 A1* | 3/2023 | Ramachandra | ......... | A61F 2/06 |
| | | | | 623/1.13 |
| 2023/0123134 A1* | 4/2023 | Masek | ............... | A61P 23/02 |
| | | | | 424/443 |

FOREIGN PATENT DOCUMENTS

| | | | | |
|---|---|---|---|---|
| DE | 102020103064 A1 * | 9/2020 | ......... | B29C 64/147 |
| DE | 102022207855 A1 * | 2/2024 | | |

* cited by examiner

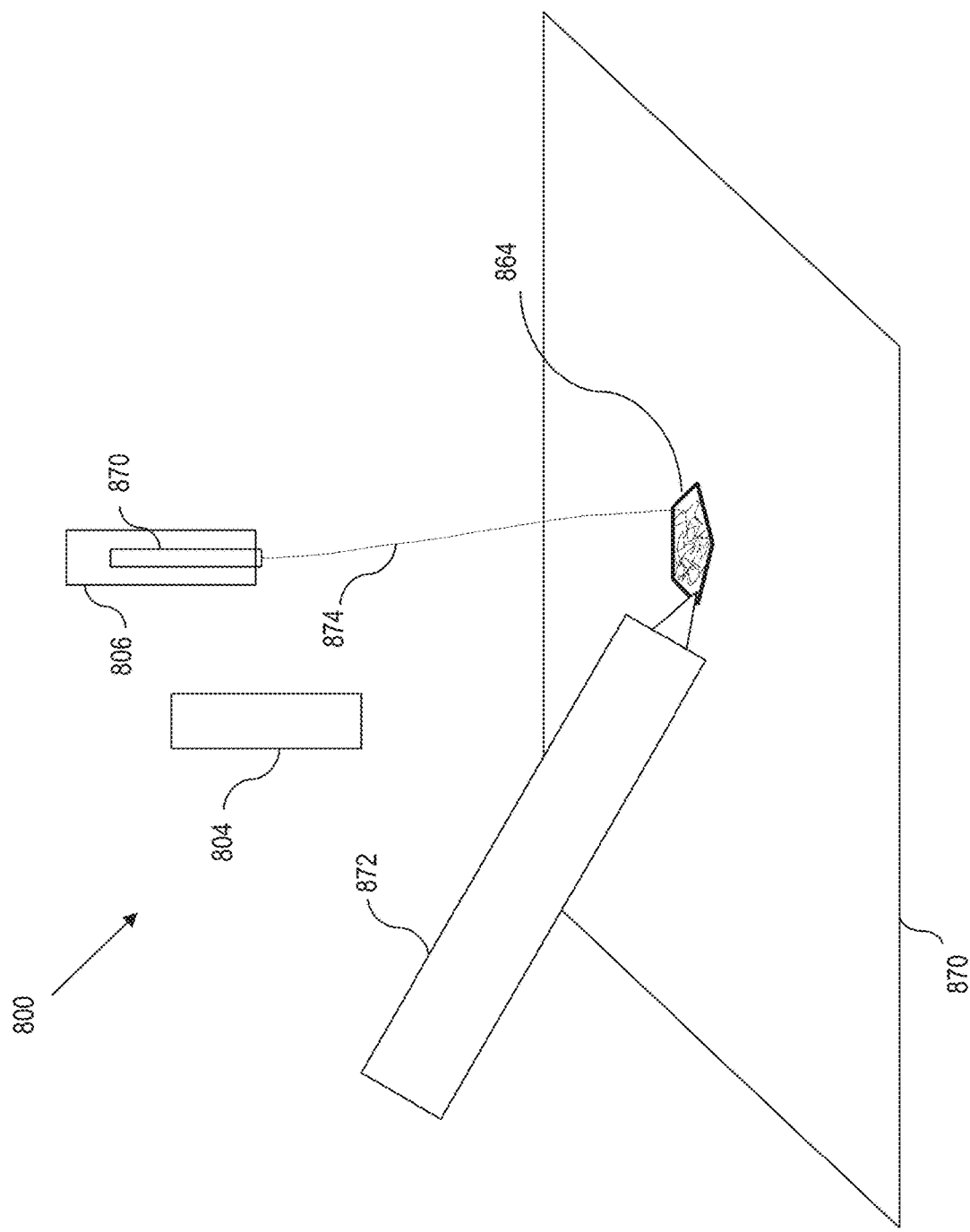

CREATING DEFINED ELECTROSPUN FIBER GEOMETRIES

CROSS REFERENCE TO RELATED APPLICATIONS

This application claims priority to and is a divisional of pending U.S. patent application Ser. No. 17/327,849 that was filed on May 24, 2021 that claims the benefit of U.S. Provisional Patent Application Ser. No. 63/028,645, filed May 22, 2020, entitled "CREATING DEFINED ELECTROSPUN FIBER GEOMETRIES", the disclosure of which is hereby incorporated by reference.

BACKGROUND

Various aspects of the present disclosure relate generally to combining manufacturing processes to create objects that exhibit properties associated with each of the combined manufacturing processes, e.g., forming structures/layers including support structures that are integrated with fibrous mesh layers, mats, membranes, etc.

Additive manufacturing is a process whereby a machine, typically referred to as a 3D printer, constructs a three-dimensional (3D) object, typically one layer at a time.

Electric field patterning is a process whereby a machine implements a method such as electrospinning, electrospraying, or electro-writing to construct an object. By way of example, electrospinning typically uses a conductive collector to generate an electric field between a spinneret, wire or plate (i.e., a device that supplies the polymer material) and the collector. Typically, the spinneret is held at a high voltage while the collector is grounded, but other configurations are also employed such as a grounded spinneret and a negative voltage collector.

BRIEF SUMMARY

According to aspects of the present disclosure, a process for creating an object is provided. The process comprises depositing a mat (e.g., fiber mat, membrane mat, etc.) on a build surface, and utilizing a manufacturing process (e.g., an additive manufacturing process such as fused deposition modeling process or other suitable process) to position a structure over at least a portion of the mat to define an object. The process also comprises removing the object from the build surface such that a first portion of the mat removed with the object is bonded to the structure and a second portion of the mat removed with the object is unsupported by the structure.

For instance, the process can further comprise printing a frame (open or closed) that supports the mat such that a portion of the mat is suspended between members of the frame.

In some embodiments, the manufacturing process comprises an extrude and cure additive manufacturing process. Here, the process is carried out by controlling the extrude and cure additive manufacturing process to print a flexible frame or gasket to support the mat, e.g., using photo, heat or vapor curable silicone elastomer.

According to further aspects of the present disclosure, a process for creating an object is provided. The process comprises printing a conductive material over a surface to define a structure (e.g., by extruding a gel polymer electrolyte, doped or composite thermoplastic material, intrinsically conducting polymer, printing a conductive ink, or otherwise depositing a conductive layer) and utilizing the printed conductive material as a collector to control an electric field deposition over the structure to define an object. For instance, in some embodiments, the process comprises controlling the electric field deposition over the structure such that a first portion of the deposition is bonded to the structure and a second portion of the deposition is unsupported by the structure.

In some embodiments, the electric field deposition comprises electrospinning a fiber, and printing the conductive material comprises printing onto an ad-hoc surface (e.g., a door, wall, object, existing structure, etc.), where the process operatively controls an insulated conducting lead to electrically couple the conductive material to an electrical circuit for utilizing the conductive material as the collector for controlling placement of the electrospun fiber.

According to yet further aspects of the present disclosure, a collector array system is provided. The collector array system can be utilized to build object, e.g., that include a fiber mesh, membrane, etc. The collector array system comprises a build plate, an electric deposition device, and a controller. The build plate comprises a non-conductive surface and conductive pins disposed within the non-conductive surface. The electric deposition device is orientable in operative arrangement with the build plate. The controller is coupled to the build plate and is operatively programmed to control individual ones of the conductive pins to be in a selected state. Here, the state of at least one conductive pin affects control of a deposition from the electric deposition device during operation thereof.

For instance, the controller can be operatively programmed to control individual ones of the conductive pins to be in a selected state (e.g., positive voltage, ground, negative voltage, floating, etc.) such that the state of at least one conductive pin affects control of a deposition from the electric deposition device during operation thereof. As another example, the controller can be operatively programmed to alternate the electrical state of multiple conductive pins in concert so that an electric field is dynamically changed to align electrospun fibers in a specific geometry induced by a specific pattern of conductive pin activation and frequency of the changing of the pattern.

BRIEF DESCRIPTION OF THE SEVERAL VIEWS OF THE DRAWINGS

FIG. 8 is a diagram illustrating controlling deposition of an electrospun mesh according to various aspects of the present disclosure.

DETAILED DESCRIPTION

Figure 1:
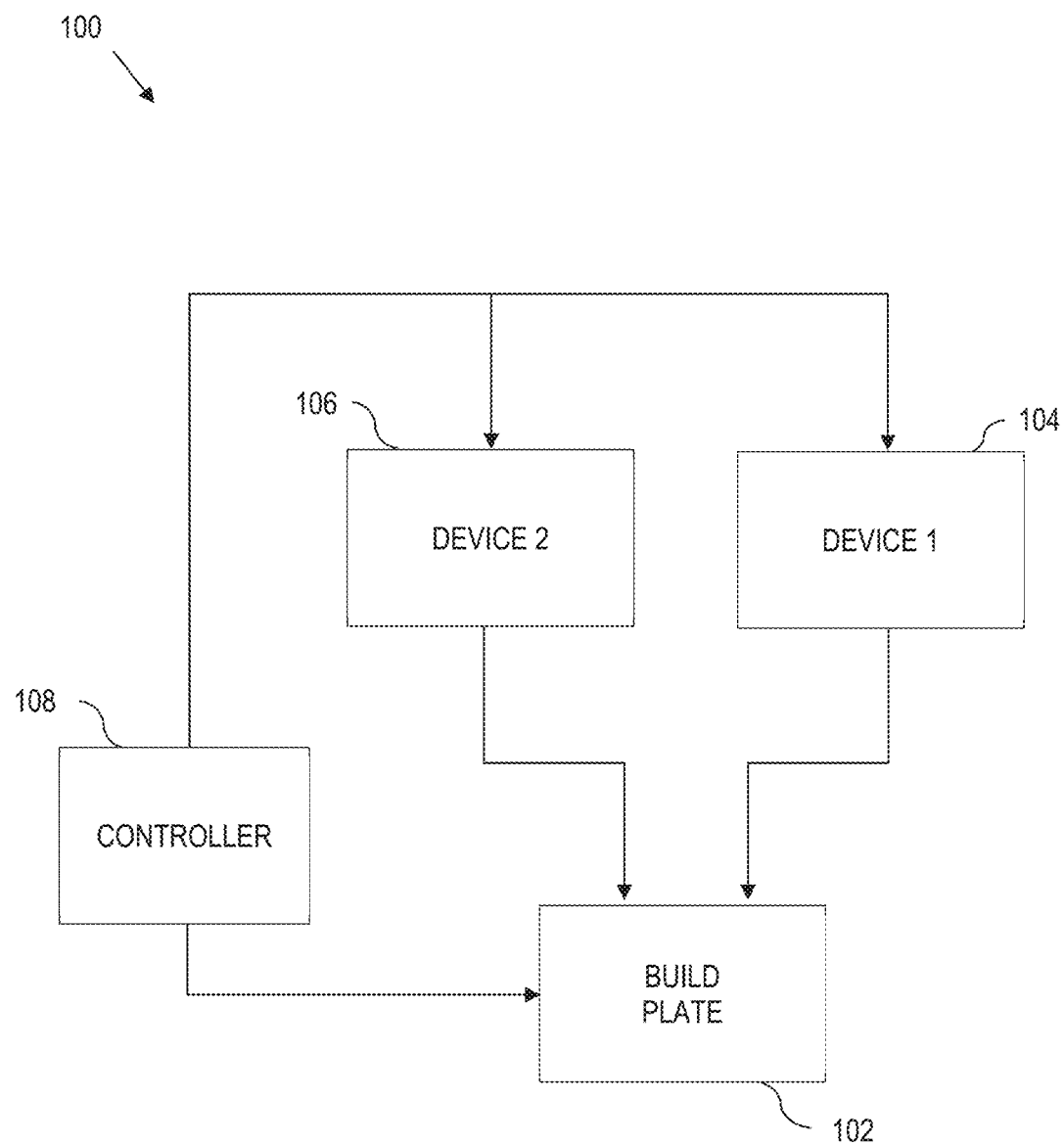
FIG. 1 is a block diagram of a system for producing an object using at least two different manufacturing processes, e.g., additive manufacturing and electrospinning, according to various aspects of the present disclosure.

Embodiments herein combine manufacturing processes into an integral workflow to create objects that exhibit properties associated with each of the combined manufacturing processes.

A non-limiting but practical example application is to bond fibers (e.g., electrospun, melt blown, etc.), other electric field patterned particles, solutions (e.g., electrohydrodynamic spray), cells, etc., with a substrate, e.g., a structure. Such substrates/structures can themselves be generated from a manufacturing process such as additive manufacturing.

As used throughout, the term "bond" or "bonding" does not mean or require permanence. In some embodiments, layers/structures/formations can be sacrificial and not form a permanent part of the object. Moreover, the term "bond" or "bonding" can include attaching, securing, affixing, resting on top of or below, positioning, adhering, joining, etc. In this regard, the term "bond" or "bonding" should not imply heat, pressure, adhesive, chemical reaction, or any other specific attachment scheme. For instance, static, electrical charge attraction, or temporary securement is sufficient to "bond" a fiber mat, membrane mat, etc., to an object, so long as the fibers, membranes, particles, solutions, etc., are positioned at a desired location within the intended object being produced.

Also, as used herein, the term "layer" is meant to include a sheet, quantity, thickness, buildup, structure, or formation. A layer may be derived from one or more additive manufacturing processes, from one or more subtractive manufacturing processes, or a combination thereof. For instance, a "layer" is not strictly limited to a monolithic sheet, nor is a "layer" strictly limited to a surface covering/continuous sheet. Rather, a "layer" is utilized to differentiate one portion of an object from another in the case of multiple, distinct portions to be discussed, and can thus include varied shapes, including line-type structures, structures that outline or partially outline a geometry, etc.

In an example embodiment, a build plate is disclosed for building devices where the build plate can function as a collector, a build surface, or both. For instance, the build plate can function as a collector for an electric field-based patterning process (e.g., electrospinning, electrospraying, electro-writing, etc.). The build plate can also function as a build surface for a manufacturing process, (e.g., additive manufacturing, subtractive manufacturing, other manufacturing process, etc.). By way of example, the build plate can function as a conductor or array of conductors during an electrospinning process to create a fiber mat, and the build plate can function as build surface during a manufacturing process (e.g., additive manufacturing process) by providing a platform to bond a structure on the previously formed fiber mat.

By way of illustration, a mat (e.g., electrospun fiber mat) can be deposited onto the build plate. A frame can then be positioned (e.g., extruded or otherwise printed) onto the mat resulting in a structure (frame) that circumscribes or at least partially circumscribes and bonds to the mat. The resulting object includes a non-backed/unsupported mat portion extending in a span between frame members.

In some embodiments, the structure need not entirely circumscribe the mat portion. For instance, the structure can have a non-closed shape or other shape, e.g., rail, irregular shape, etc. Here, a first portion of the mat bonds with the structure, and a second portion of the mat extends out from, across, through, etc., but is not directly bonded to the structure. Numerous other configurations can apply.

In another example embodiment, an electrohydrodynamic spraying process is utilized to deposit droplets on a build plate, e.g., as droplets, or to form a membrane, using the build plate to function as a collector. Then, a process such as an extrusion process prints a backer onto the deposited droplets.

In yet another example embodiment, a conductive structure is printed, extruded, deposited, etc. For instance, a gel-polymer electrolyte (GPE) or other conductive material can be extruded to form a structure. Because the structure is conductive, the structure itself can itself function as a collector, e.g., for directing the deposition of electrospun fibers or electrosprayed particles that bond with the conductive structure. In such embodiments where a conductive structure functions as a collector, a formal build plate is not strictly needed.

In still another example embodiment, a build plate is provided, which can function as a collector, which includes conductive pins that can be controlled, such as individually and dynamically, e.g., to carry a positive voltage, carry a negative voltage, be grounded, or floating. Based on the state (i.e., positive voltage, a negative voltage, grounded, or floating) of the conductive pins at any given time, a pattern can be created on the build plate during a electric field patterning process, e.g., an electrospinning process, electrohydrodynamic spray process, etc.

Optionally, at least some of the conductive pins can extend into and out of the build plate surface. This allows positioning electrodes at positions that are not on the build surface (e.g., to build an object on a non-conductive substrate that is positioned on the build plate, for example).

Embodiments herein thus provide ways to integrate and target fibers, droplets, cells, etc., into structures to create three-dimensional objects. The systems and processes herein facilitate integrated device fabrication process and platforms, reducing multi-step and manual processes to create objects, improving yield, increasing reliability, improving quality, and saving time. Notably, approaches herein do not require manual manipulation and attachment/integration of separately spun fibers, droplet structures, cells, etc., which are delicate and difficult to handle, thus providing an improvement over conventional techniques. Approaches herein also improve upon methods that require multi-step surface treatments, as will be described in greater detail herein.

Example System (Block Diagram)

Turning now to FIG. 1, a system 100 for fabricating devices is shown. The system 100 comprises a build plate 102. In general terms, the build plate 102 provides a work or build surface to create objects. As will be described in greater detail below, in some embodiments, the build plate 102 is conductive or is otherwise includes a conductive layer. In other embodiments, the build plate 102 includes conductive pins or conductive portions (examples of which are described in greater detail herein). In yet other embodiments, the build plate 102 need not be conductive. In still other embodiments, the build plate 102 need not be a dedicated and defined structure, but is rather, any surface.

For example, a portable implementation of the system 100 enables building structures in an impromptu fashion, using any ad-hoc structure (e.g., a wall, a floor, a door, another object, etc.) that is designated as functioning as a build surface, as described more fully herein.

The system 100 also includes a first device 104 that is positioned or is otherwise positionable in cooperation with the build plate 102. In practical applications, the first device 104 can comprise an additive manufacturing device. In other embodiments, the first device 104 can comprise a subtractive manufacturing device, hybrid additive/subtractive manufacturing device, or other device that manipulates, assembles, builds, forms, shapes, or otherwise defines a structure of an object to be constructed.

The system 100 further includes a second device 106, which is also positioned or otherwise positionable in cooperation with the build plate 102. In practical applications, the second device 106 can comprise an electric field patterning device (e.g., electrospin device, electrospray device, electrowrite device, etc.), a melt blow device for forming fibers, a device for depositing solutions, for creating cells, etc.

In yet further embodiments, the first device 104 can comprise multiple printheads (or be implemented in practice as multiple additive manufacturing devices).

For instance, one print head can print a thermoplastic, metal or other material. By way of example, one print head can implement a fused deposition modeling (FDM) device. The FDM printhead may be used to print a structure for an object that bonds directly with a mesh/mat, etc. Alternatively, the FDM printhead may print a body, support structure, or other portion of an overall object.

A second printhead may print a conductive material. Many techniques can be utilized to print the conductive material. As such, the term "print" is intended to refer to an additive manufacturing approach generally, and includes printing, depositing, extruding, laser deposition, and other forms of processing that enable the formation of a layer/structure that is conductive. Moreover, depending upon the application, in some embodiments, the conductive material is sacrificial, and not intended to be a permanent part of the object. In other embodiments, the conductive material is permanent.

As an illustrative example, the second printhead can be an extrusion printhead that extrudes a conductive material, e.g., a metal, a gel-polymer-electrolyte (GPE), etc.

As another example, the second printhead can print a doped or composite thermoplastics (e.g. cyclic olefin copolymer—graphene composite) or intrinsically conducting polymers (ICPs) (e.g. conjugated polypyrrole) over a surface to define a structure. Here, the system can utilize the conductivity to control an electric field deposition over the structure to define an object.

As yet another example, the conductive material can be a conductive powder, ink, or other material that is printed to define a structure that can function as a collector.

In certain embodiments described later herein, reference is drawn to GPE solely for sake of example. In this regard, for any embodiment associated with the FIGURES or otherwise described herein, any conductive material/layer/structure can be utilized so long as the conductive material/layer/structure can function as a collector or otherwise function as a contact point for a fiber/membrane/cell, etc. Thus, the embodiments should not be limited to GPE or other conductive material unless specifically noted as such.

The second printhead may be used to print collector(s), e.g., to add a layer of conductive material over a portion of an object printed with the first printhead, to deposit collectors on a build plate or other surface, etc. Thus, the system supports a primary structural manufacturing (printing or otherwise) system for building portions of an object. The system also supports the ability to position collectors so as to be able to position a fiber, mesh, mat, membrane, deposition, or other component that is at least partially unsupported by the structure of the object, at a desired position, e.g., below, on top of, or inside the object (as the object is being built). The fiber, mesh, mat, membrane, deposition, or other component can thus be randomly oriented or aligned relative to the object.

For instance, after fabricating an incomplete portion of the object using the first printhead, assume a fiber mesh is needed. The system thus changes over to the second printhead and prints (e.g., extrudes) a conductive layer (e.g., a GPE layer) around a perimeter of where the fiber mesh is to be positioned. This conductive layer is utilized as a collector. In particular, the system grounds the conductive layer. For instance, as will be described in greater detail herein, a nearest ground pin of the build plate 102 can raise and/or shift into an operable position. Alternatively, a ground pin can be manipulated by a robotic needle from a side of the object to complete an electrical circuit necessary to ground the conductive layer. As another example, a ground can be otherwise manipulated into position to ground the conductive material. The system then utilizes the second device 106 to electrospin to the area containing the conductive layer. Once the fiber mesh is deposited, the system can go back to printing the rest of the object as described above, encapsulating the fibers on the inside the object, positioning fibers on the bottom, top, or wherever needed.

In this implementation, the first printhead defines a printhead for a structural device (e.g., FDM printing a thermoplastic) and the second printhead defines a printhead that prints the conductive layer for patterning/defining a collector.

From a practical matter, in some embodiments, the first device 104 and the second device 106 are physically integrated into one device. In other embodiments, the first device 104 and the second device 106 are separate physical devices.

The system 100 also includes a controller 108. As illustrated, the controller 108 is operatively coupled to at least one of the build plate 102, first device 104, and second device 106. While shown as one controller 108, in some embodiments, the controller 108 can be implemented as multiple discrete controllers. For example, the first device 104, the second device 106, and the build plate 102 may be controlled by any number of controllers, including being controlled by separate controllers 108. In some embodiments, the first device 104 is controlled by a dedicated controller, the second device is controlled by a dedicated controller, and an overall master controller orchestrates an overall manufacturing process. Given this flexibility, a single controller 108 is schematically shown for simplicity of the discussion of the system 100 of FIG. 1.

The functioning of the controller 108 will be described in greater detail below, e.g., with regard to example embodiments. However, for sake of introduction, the controller 108 can control functions and features of the build plate (e.g., translation stage movement, control electrical characteristics (such as where the build plate 102 includes one or more conductors), etc. With regard to the first device 104 and/or the second device 106, the controller 108 can control mix, flow, extrusion, powder delivery, device movement relative to the build plate 102, patterning (e.g., according to Computer Aided Design (CAD) programming, pattern programming, or other control specifications, etc.

Example Fiber Mat on Build Plate

An example application of the features disclosed herein, is to bond a structure to a fiber structure, membrane structure, etc. For example, electrospun fibers function well as filter membranes. However, once spun, such filter membrane structures are delicate and can break apart easily. This makes picking up and assembling the fiber filter membrane structure to a structure (e.g., a cup, well, etc.) extremely difficult and prone to failure in manufacturing. Likewise, spraying droplets to define a membrane suffer similar drawbacks. However, this problem is solved with a unique solution herein.

As will be described in greater detail herein, a system and process are provided for creating an object. The process comprises depositing a mat on a build surface, utilizing a manufacturing process to position a structure over at least a portion of the mat to product an object, and removing the object from the build surface such that a first portion of the mat removed with the object is bonded to the structure and a second portion of the mat removed with the object is unsupported by the structure.

Figure 2:
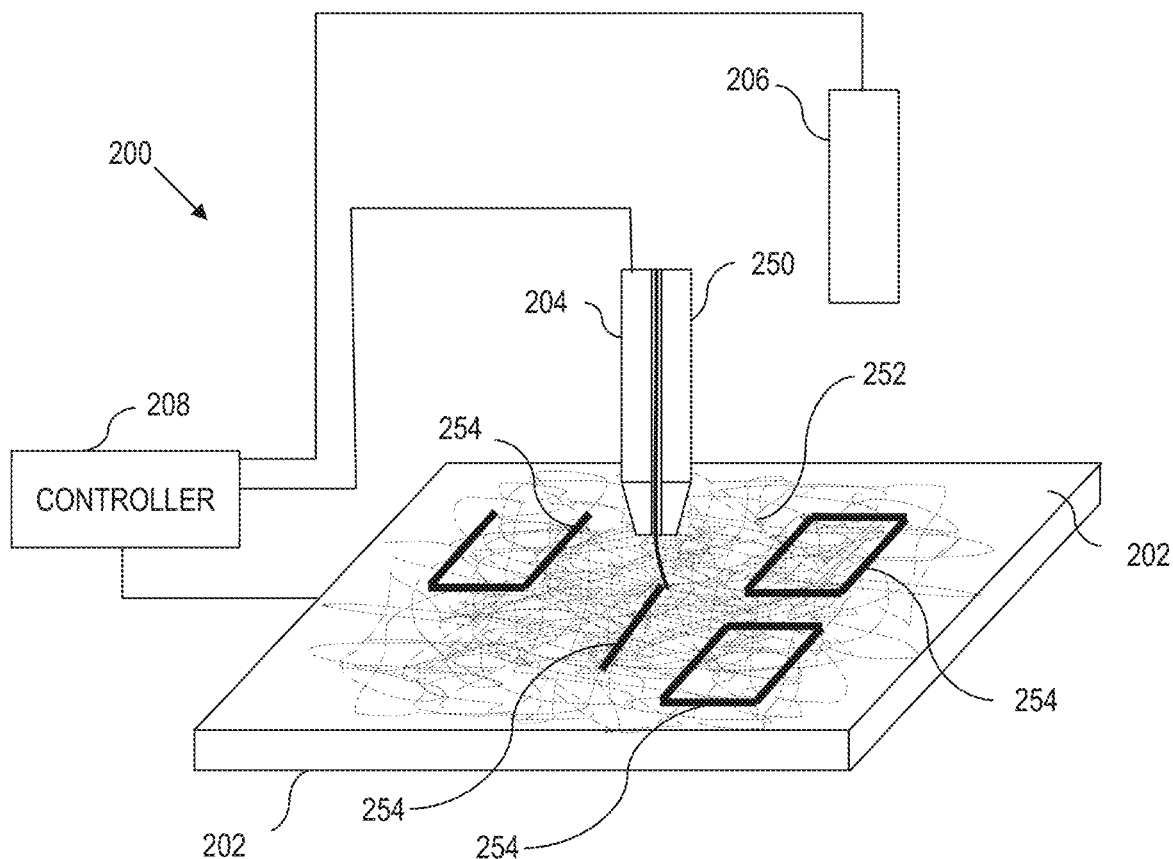
FIG. 2 is a diagram illustrating use of a build plate to build a three-dimensional object that includes an electrospun mat, according to various aspects of the present disclosure.

Referring to FIG. 2, a system 200 is illustrated for creating a fiber mesh-based object. The system 200 can be implemented using any combination or components thereof, of the structures of FIG. 1. As such, like structure is illustrated with like reference numbers 100 higher. Where like structure is provided, only differences or specific implementations are described for sake of conciseness.

In summary, the system 200 includes a build plate 202, a first device 204, a second device 206, and a controller 208.

The build plate 202 is analogous to the build plate 102 of FIG. 1. In some implementations, such as where the fiber mesh is created using an electric field patterning process (e.g., electrospinning), the build plate 202 can either include a conductive layer, or include conductive pins, examples of which are described in greater detail below. Where the fiber mesh is created using an alternative process, e.g., melt blown, the build plate 202 is configured for the associated technology.

In an example embodiment, the first device 204 comprises an additive manufacturing device that is positioned or positionable in operative arrangement with the build plate 202. For instance, the additive manufacturing device can comprise a fused deposition modeling (FDM) device 250. In one form, the FDM device is an FDM printhead. FDM may also be referred to as Fused Filament Fabrication (FFF) or Thermoplastic Extrusion Additive Manufacturing (TEAM).

The second device 206 generates a mat, e.g., an oriented, non-woven fibrous structure, a membrane, a cell, etc. Thus, depositing the mat onto the surface (e.g., build plate) may be carried out by forming a fiber mat by at least one of electrospinning at least one fiber, or melt blowing at least one fiber, or electrohydrodynamic spraying a membrane layer to define the mat as a membrane mat (e.g., using an electrohydrodynamic spray device that can spray molecules that bind to form a membrane).

The second device 206 can alternatively comprise an electrospinning device 206 that is also positioned or positionable in operative arrangement with the build plate 202.

As will be illustrated herein, to solve the problem of highly ordered polymer fibers stacking, an approach is provided that manages the electric field configuration in the electrospinning space (as opposed to modifying the electrode). This approach is described in greater detail herein, with regard to the build plate with conductive pins.

Still further, the controller 208 is coupled to the build plate 202, the first device 204 (e.g., additive manufacturing device), and the second device 206 (e.g., electrospinning device). The controller 208 is operatively programmed to control the electrospinning device to print a fibrous, electrospun mat onto the build surface, and control the additive manufacturing device to print a structure on top of the electrospun mat.

Essentially, as illustrated, the system 200 first deposits/creates/forms a mat 252 on the build plate 202 (e.g., a fiber mat, a membrane mat, etc.). This can be carried out by using the second device 206 to form the mat. In an example embodiment, a fiber mat is created by electrospinning fibers over the build plate 202.

Once the mat has been formed, the system 200 deposits one or more structures 254 over the fiber mat 252 so that the structure bonds with the mat. Solely for sake of example, a structure can comprise a closed frame that circumscribes a portion of the mat 252, an open frame that overlies a portion of the mat 252, a rail bonded to the mat, a set of rails having a portion of the mat 252 unsupported and spanning therebetween, or a structure 254 can take other configurations.

Regardless of the configuration of the structure 254, in some embodiments, the final object includes the structure and a portion of the mat (e.g., forming a fiber mesh). Moreover, the object is created such that at least a portion of the mat is not backed by the structure. That is, a portion of the mat forms a scaffold, suspended portion, unbacked portion, unsupported portion, or combination thereof.

In some embodiments, FDM may be used to print on an electrospun mat (e.g., directly on top of an electrospun mat), where the build plate 202 is used as the electrospinning collector and the FDM build platform. Thus, the electrospinning collector and FDM build platform are shared.

FIG. 2 illustrates that a large fiber mesh 252 can be used to create multiple objects 254, which may be the same or different. Once the first device 204 finishes bonding the structure(s) to the fiber mesh, the object(s) can be removed from the build plate as an integral, bonded object(s).

Thus, by way of example, an object such as a filter with a fiber mesh filter membrane can be created in an integral process. This avoids the need to separately create a fiber mesh, and then try to manually secure the mesh to a frame, which is difficult and prone to failure due to the fragility of the fiber mesh.

In this example embodiment, the build plate facilitates a process directed to printing (e.g., extrusion printing) of one or more structures (e.g., frames/gaskets, channels, rails, and other geometries) onto a fiber mat (e.g., an electrospun mat). Regardless of the manufacturing processes utilized, the overall object exhibits properties associated with each of the combined manufacturing processes. In the above example, the properties related to the printing process include the structure (e.g., printed frames, gaskets, channels, rails, structures, etc.), which may be conductive or non-conductive. Moreover, at least a portion of the structure is bonded to the fiber mat. The properties related to an electrospinning process include a first portion of the fiber mat that bonds with the structure, and a second portion of the fiber mat that is not backed by the structure (e.g., is unsupported, open frame, etc.).

Droplet

In some embodiments, the second device 206 can comprise a spray device, such as an electrohydrodynamic spray device. Here, the spray can either be tightly controlled such that the molecules bond into a solid structure such as a membrane, or droplets can form on the build plate. In a configuration where the spray is not solidified, the first device 204 can print a backer over the droplets.

Example—Cup with Fiber Mesh

Figure 3:
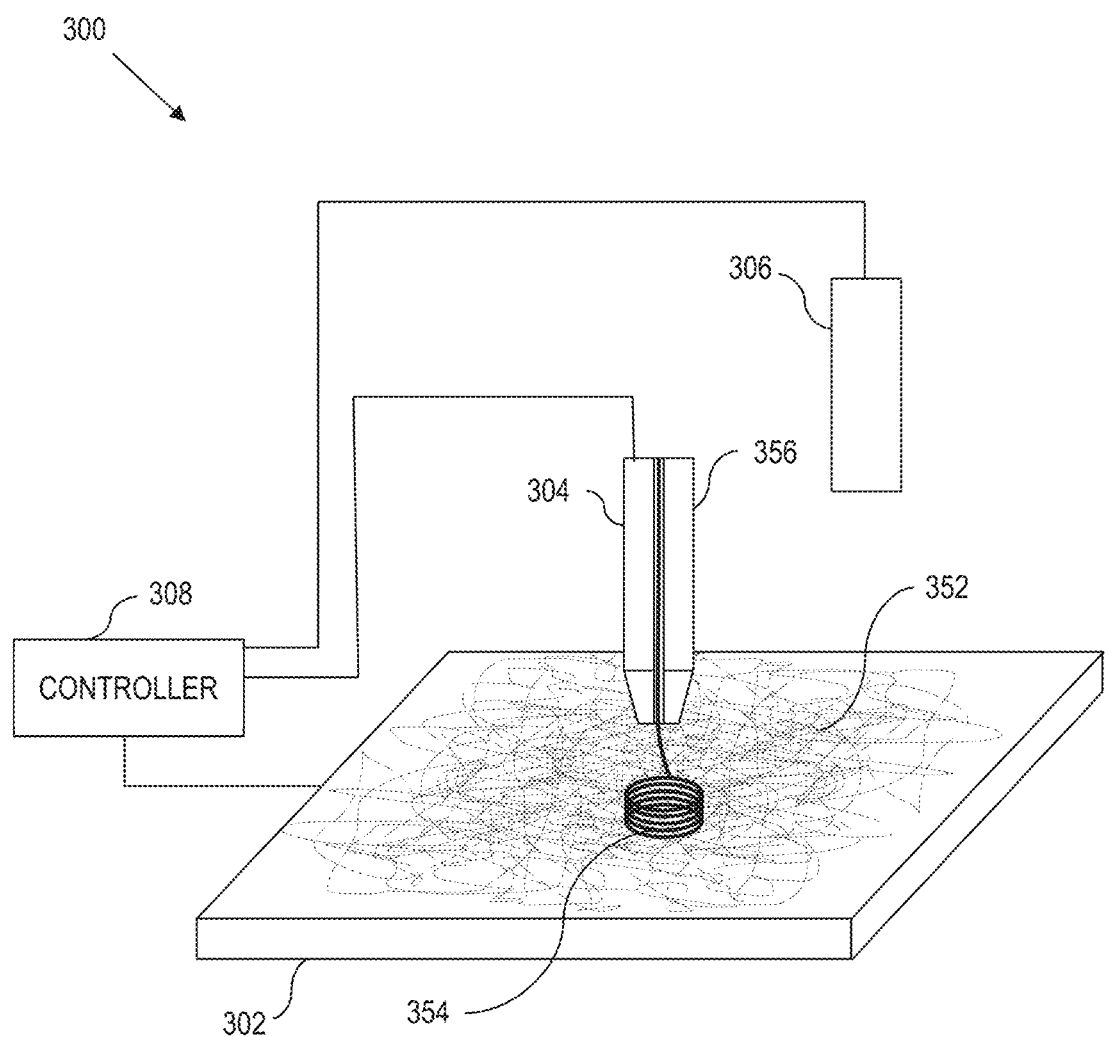
FIG. 3 is a diagram illustrating use of a build plate to build a three-dimensional object such as a cup, which includes an electrospun mat, according to various aspects of the present disclosure.

Referring to FIG. 3, a system 300 is illustrated for creating a fiber mesh-based object. The system 300 can be implemented using any combination of features described with reference to the preceding FIGURES. As such, like structure is illustrated with like reference numbers 200 higher. Where like structure is provided, only differences or specific implementations are described for sake of conciseness. More specifically, the system 300 can be implemented using the same configuration as the system 200 of FIG. 2.

In summary, the system 300 includes a build plate 302, a first device 304, a second device 306, and a controller 308. In an example embodiment, the system 300 forms a fiber mat 352 (analogous to the fiber mat 252, FIG. 2) on the build plate 302. The system then forms a structure 354 on the fiber mat 352.

The first device 304, e.g., an FDM device 356, can be used, for example, to print a well insert cup, such as a Transwell insert cup 354 (Transwell is a registered Trademark of Corning Incorporated) on top of the fiber mat 352. Essentially the well cup is the 'frame' for the fiber mat 352. This approach bypasses the challenge of attaching delicate electrospun nano-fiber mats/membranes to prefabricated (typically injection molded) thermoplastic well insert cups. The build plate 202 thus allows for additive manufacturing to place the well insert cup on top of a previously fabricated nano-fiber mat.

Referring to FIG. 2 and FIG. 3 generally, in some respects, the illustrated approach may limit the three dimensional architecture of fabricated devices to having the mat on a single side/face of a device. For instance, normally, FDM onto electrospun or other fiber-spinning (melt electrospinning, pneumatic spinning) can achieve a single, base layer to be printed. However, it is possible to fabricate an object with an internal electrospun mat by introducing additional steps and handling, such as inverting the printed object, remounting onto the build plate 202, and introducing another electrospun process to deposit a second fiber structure, etc. As another example, the process can comprise inverting the object, repositioning the object on the surface of the build plate, and bonding another section of mat to the object.

Furthermore, such approaches must account for the delicate nature of the underlying fibrous mat so as not to tear the fiber mesh while printing and/or handling. In this regard, some embodiments use extrude and cure additive manufacturing, e.g., with ultraviolet (UV) curable silicone elastomers to create flexible gaskets/frames that support the fibrous mat. Some example embodiments use a curable silicone elastomer that that changes state (solidifies) after printing. In other embodiments, a flexible frame or gasket is printed using a photo, heat or vapor curable silicone elastomer. Such structures further enable additional processing, e.g., the flexible structure allowing the object to be easily inserted between adjacent orifices/chambers in a product, etc. This approaches herein increase the number and type of materials that may be employed and can reduce the forces that may be imparted by thermoplastic printing, which can tear or deform the underlying mat. Moreover, such approaches can be integrated into a multi-tool, multi-process additive manufacturing system that has multiple and differing print-heads, etc.

Utilizing techniques herein, allows for devices to be made that were previously not possible or difficult to create. For example, as shown in the illustrated embodiments, objects can be built that incorporate a fiber mesh that bonds to a structure, where at least part of the fiber mesh is unsupported. As a few other examples, a dielectric material or an insulator may be built onto the plate and then electrospinning may be used to add to the dielectric material or insulator. Further, different patterns can be created during electrospinning, e.g., by changing the electric field (e.g., oscillating, discrete control, etc.) created by the array of pins in the build plate (i.e., a dynamic collector array).

Example—Conductive Structure

In some embodiments, the first device, e.g., an additive manufacturing device, can print a conductive layer that functions as a structure such as a collector for a subsequent process. This facilitates the ability to apply a fiber or membrane structure over the structure, e.g., by using the structure as the collector for a subsequent electrospinning process or electrohydrodynamic spraying process.

In this regard, a process for creating an object comprises printing a conductive material to define a structure (e.g., collector). Here the conductive material can comprise GPE, a doped or composite thermoplastics (e.g. cyclic olefin copolymer—graphene composite), intrinsically conducting polymers (ICPs) (e.g. conjugated polypyrrole), conductive ink, conductive powder, etc., over a surface to define the structure, and utilizing the conductivity to control an electric field deposition over the structure to define an object. Here, a first portion of the deposition is bonded to the structure and a second portion of the deposition is unsupported by the structure. More particularly, the second portion can form a scaffold, suspended portion, unbacked portion, unsupported portion, or combination thereof.

In an example embodiment, printing the conductive layer comprises printing a conductive a structure in a pattern corresponding to a shape of the object. As another example, printing the conductive layer comprises printing a conductive a structure in a pattern corresponding to a shape of a desired fiber mat, membrane, or other component of an overall object. For instance, the conductive layer can be utilized as a collector to control an electric field deposition over the structure by electrospinning a fiber mesh inside or on top of the object.

Yet further, complex builds can be realized, e.g., by extruding a first material to form a first part of the object and printing the conductive layer along the object where a fiber mesh, membrane or other feature is desired. Thus, the process can, for example, electrospin a fiber mesh over an extruded gel polymer electrolyte (or other conductive layer that can function as a collector) to form a mesh inside, on top of or otherwise positioned in a desired location in an overall object, as noted with regard to FIG. 1. Once the mesh is deposited, the remainder of the build can take place.

Figure 4:
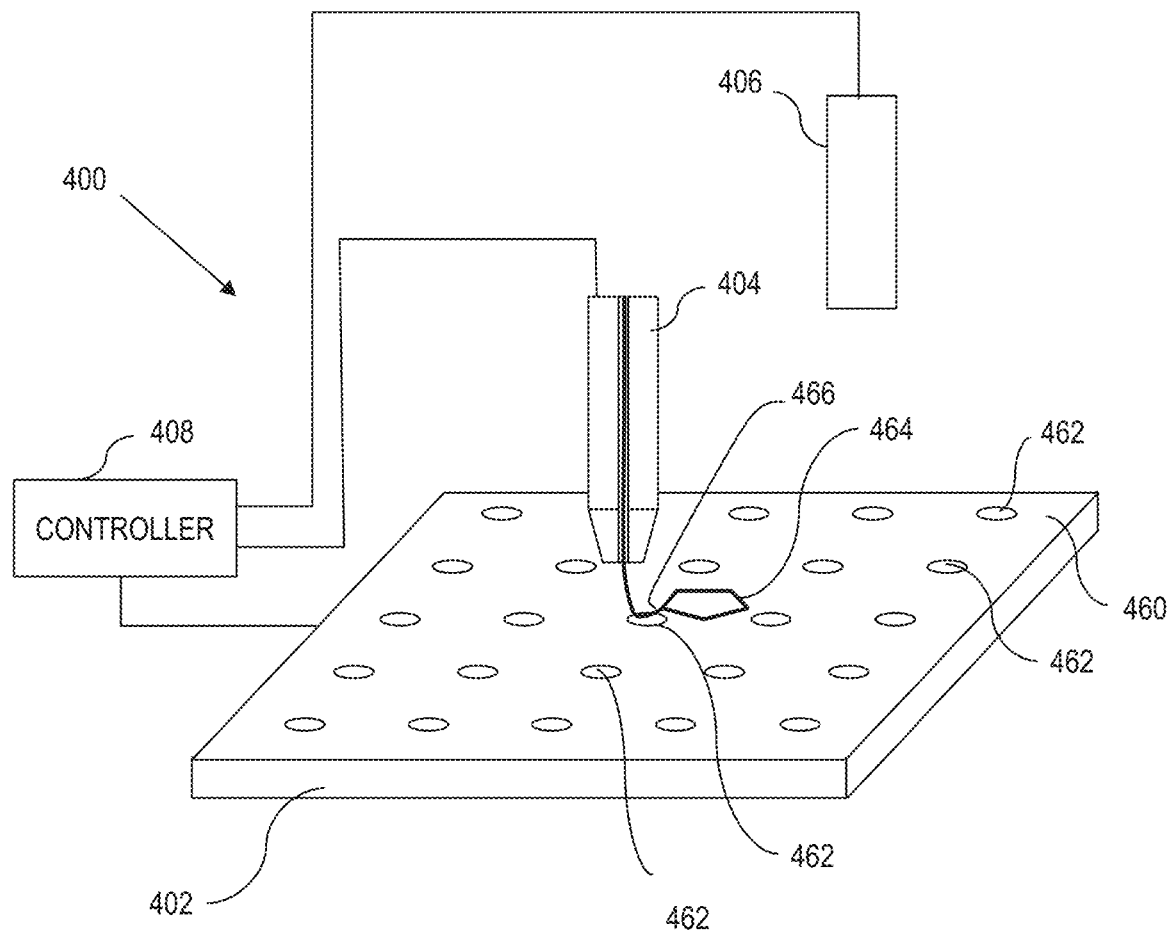
FIG. 4 is a diagram illustrating use of a build plate with pins to control placement and shape of electrospun fibers, according to various aspects of the present disclosure.

Referring to FIG. 4, a system 400 is illustrated for creating an object that includes a fiber mesh. The system 400 can be implemented using any combination of features described with reference to the preceding FIGURES. As such, like structure is illustrated with like reference numbers 300 higher than like structure of FIG. 1; 200 higher than like structure of FIG. 2; and 100 higher than like structure of FIG. 3. Where like structure is provided, only differences or specific implementations are described for sake of conciseness.

In summary, the system 400 includes a build plate 402, a first device 404, a second device 406, and a controller 408.

However, different from the preceding approaches, the system 400 uses the first device 404 to lay down a structure such as a conductive layer that functions as a collector. A fiber mesh is subsequently positioned over the structure.

In this regard, the first device 404 can comprise an additive manufacturing device that is positioned or otherwise postionable in operative arrangement with the build plate 402. By way of example, the first device 404 can comprise and additive manufacturing extruder for extruding a material such as a gel of electrolyte (e.g., a gel-polymer-electrolyte (GPE)) onto the build plate 402 to form a shape corresponding to a desired shape of a part to be fabricated. As another example, the extruded material can comprise a conductive thermoplastic, or other conductive material. Yet further, other conductive materials can be printed as described more fully herein.

In this regard, here (and in any embodiment herein), The printed conductive material may form a layer that is permanent (in that it has its own purpose) or the material may be sacrificial. For instance, a sacrificial layer could be a dissolvable conductive material or a material that once dried has negligible effect on the remainder of the object.

In an example an alginate is used. As another example, a gel polymer electrolyte with $CH_3COOH$ acetic acid infused sodium alginate can be used as such a formulation can show ionic conductivity values in the range of $8.7 \times 10^{-5}$ S/cm, and thus may make a suitable ink for printing a conductive layer.

In some embodiments the gel of electrolyte comprises a gelatin-based solution according to the ratio: 1.7532 g NaCl; 30 mL water; 5 g Gelatin; 5 mL glycerol. Here, the glycerol acts as a plasticizer and increases conductivity. However, other materials, or compositions can be utilized to increase conductivity.

In an example embodiment, the second device 406 comprises an electric field device, e.g., an electrospinning device, that is positioned or otherwise positionable in operative arrangement with the build plate 402. Once the shape is formed from the conductive layer, the system 400 uses the shape as a collector to form a deposition, e.g., to electrospin a fiber structure over the shape, to electrohydrodynamically spray a membrane over the shape, etc. Here, the deposition can span portions of the shape such that deposition sections are unsupported or unbacked by the shape of the structure. More particularly, the unsupported portion can form a scaffold, suspended portion, unbacked portion, unsupported portion, or combination thereof.

Example Build Plate

FIG. 4 also illustrates a new type of build plate. The build plate 402 can be used as an example of the build plate in any of the preceding FIGURES.

The build plate 402 has a build surface having a non-conductive surface 460 and conductive pins 462 arranged within the non-conductive surface 460. Note that the conductive pins 462 are illustrated with a circular shape. Not all conductive pins 462 are numbered for sake or reducing clutter in the figure.

In the practical implementation illustrated, the conductive pins 462 are arranged in an array. In the example illustration, the array is a five-by-five array, but the array may be any configuration. For example, the substrate 460 can support any practical number of conductive pins 462. Moreover, the conductive pins 462 can be arranged in any practical configuration, including arrays that have less than five rows, more then five rows, less than five columns, more than five columns, combinations thereof, etc. Yet further, the spacing between adjacent conductive pins 462 can be set to any practical spacing. Still further, the conductive pins 462 need not strictly be organized into equally spaced arrays. Rather, any pattern or configuration can be utilized, where such pattern may be application specific.

The conductive pins 462 of the array are controlled to establish a state for each conductive pin 462. Control may be implemented, for instance, by a controller 408 (e.g., analogous to the controller 108, FIG. 1). Example states include by way of example, a positive voltage, a negative voltage, ground, or floating (collectively, a state of the pin) on an individual basis. Thus, a single conductive pin 462 or a subset of the conductive pins 462 may be forced to a specific state dynamically, while other conductive pins 462 are held at (or are otherwise forced to) a different state. The conductive pins 462 may be controlled to be at one state at a certain time, then switch to a second state after a time has passed, etc. The collective state of the conductive pins 462 creates an electric field that changes how the electrospun threads are spun (deposited) (or how electrohydrodynamically sprayed droplets are deposited) onto the build plate 402.

Solely by way of example, for sake of clarity of explanation, a fiber mesh is created responsive to the output of the electrospinning device. For instance, a polymer deposited on the collecting electrode has a potential opposite to that of a syringe (e.g., ground) of the electrospinning device. At the moment of polarity reversal, electrical forces begin to act on the negatively charged polymer, causing a shift of a deposition region to the other collector. Due to the continuity of the polymer and charge repulsion, fibers are laid parallel to each other in the intercollector gap. Also, the distribution of the electric field strength between collectors creates a significant additional tensile force at relatively small interelectrode distances.

The setup rise and fall times and root mean square (RMS) voltage can be readily changed by adding an appropriate current limiting resistor or other technique to the outputs or using high-voltage pulse width modulation technique. Also, the width of generator output pulses can be varied within the wide range (10 ns-∞) and it is limited only by the transient time. The switching frequency is related to the fiber deposition velocity and electrohydrodynamic jet motion speed and can be extended, e.g., from 0 to 50 kHz in some example embodiments.

Moreover, various embodiments of the build plate 402 include a temperature control to allow for heating, cooling, or both of the build plate 402. the heated/cooled build plate can be used to modify properties of electrospun particles by accelerated evaporation of solvents, de-hydrothermal cross-linking, etc. The cooling ability may also be used for condensation/vapor deposition to form membranes and/or secondary coatings on fibers. In this regard, in some embodiments, the temperature of the build plate 402 can ben controlled by the controller 408.

Using the Build Plate with Conductive Pins

As noted above, the first device 404 can comprise an extrusion device for extruding material such as a gel of electrolyte (e.g., a gel-polymer-electrolyte (GPE)) onto the build plate 402. As illustrated, the controller 408 controls the first device 404 to form a shape 464. More specifically, the first device 404 places a lead 466 that couples the shape 464 to a specific pin of 462 of the array of conductive pins 462.

After forming the shape 464, the system 400 spins a fiber structure, e.g., a fiber mesh, over the shape 464. Here, the controller 408 controls the state of the pin 462 coupled to the lead 466 while keeping the rest of the pins 462 at a floating state (or at some other dynamic or static state depending upon the application.) In this manner, the shape 464 functions as a collector by virtue of being conductively tied to the conductive pin 462 via the lead 466. This causes fibers electrospun by the second device 406 to be deposited on/across the shape 464 during electrospinning.

For instance, a printed gel-polymer-electrolyte can be formed in the shape of a frame to receive a fiber mat bonded thereon. Even where the shape 464 avoids contact with conductive pins 462 other than the lead 226, the electrospinning process can spin fibers because the frame/shape 464 is electrically functioning as the collector for the electro spinning process.

Depending on the size of the mat desired, the spinneret-collector distance may need to be adjusted. For example, depending upon whether the application desires fibers collecting outside and around the GPE, inside, or both. To get the desired pattern the distance can be controlled.

In practical applications, object formation can be carried out by moving the first device 404 (e.g., print/extrusion device) and/or second device 406 (e.g., electrospinning spinneret), such as by a multi-axis translation stage. In other embodiments, the first device 404 (e.g., extrusion device) and/or second device 406 (e.g., electrospinning spinneret) may be fixed and the build plate 402 may by moved, e.g., by a multi-axis translation stage. In yet other embodiments, all components may be able to move according to programmed movements. Regardless, the movement of the build plate 402, the first device 404 (e.g., extrusion device) and/or second device 406 (e.g., electrospinning spinneret), or combination thereof, can be controlled by the controller 408.

In this implementation, the build plate 402 provides a single platform that is mutually compatible with the electrospinning/electrospraying structures and membranes as well as supporting the build plate properties such as heating/cooling to aid in adhesion and release of three-dimensional printed parts. The build plate 402 further provides a cooled/heated platform that may be used to modify properties of electrospun particles, e.g., as noted more fully herein.

Yet further, when using the illustrated build plate 402 with conductive pins 462, the conductive pins 462 provide for dynamically changing the electric-field to influence the pattern of fiber formation and electrospray.

Moreover, as noted above, a conductive lead/collector, e.g., a gel-polymer electrolyte, can be printed in a specific pattern/geometry to induce a corresponding fibrous mat to be deposited thereon, through subsequent electrospinning.

Also, a small sized pattern may allow multiple instances in a single device or print session. For instance, by turning a ground on a single pin and floating or applying a bias voltage to all other pins, fiber deposition will be focused to the gel polymer electrolyte pattern that has been printed and connects to the currently grounded conductive pin 462. Upon completion, that conductive pin 462 is switched to floating and the next desired area is activated (grounded) and a new gel polymer electrolyte pattern is printed and connected to that pin, etc. This allows multiple instances of an object, or different objects altogether, to be built in a single operation on the build plate 402.

In all of these instances, the polarity may also be inverted to allow the spinneret to be grounded while a positive or negative potential is applied to the collector.

Example Suspended Fiber Mesh Between Supports

Figure 5:
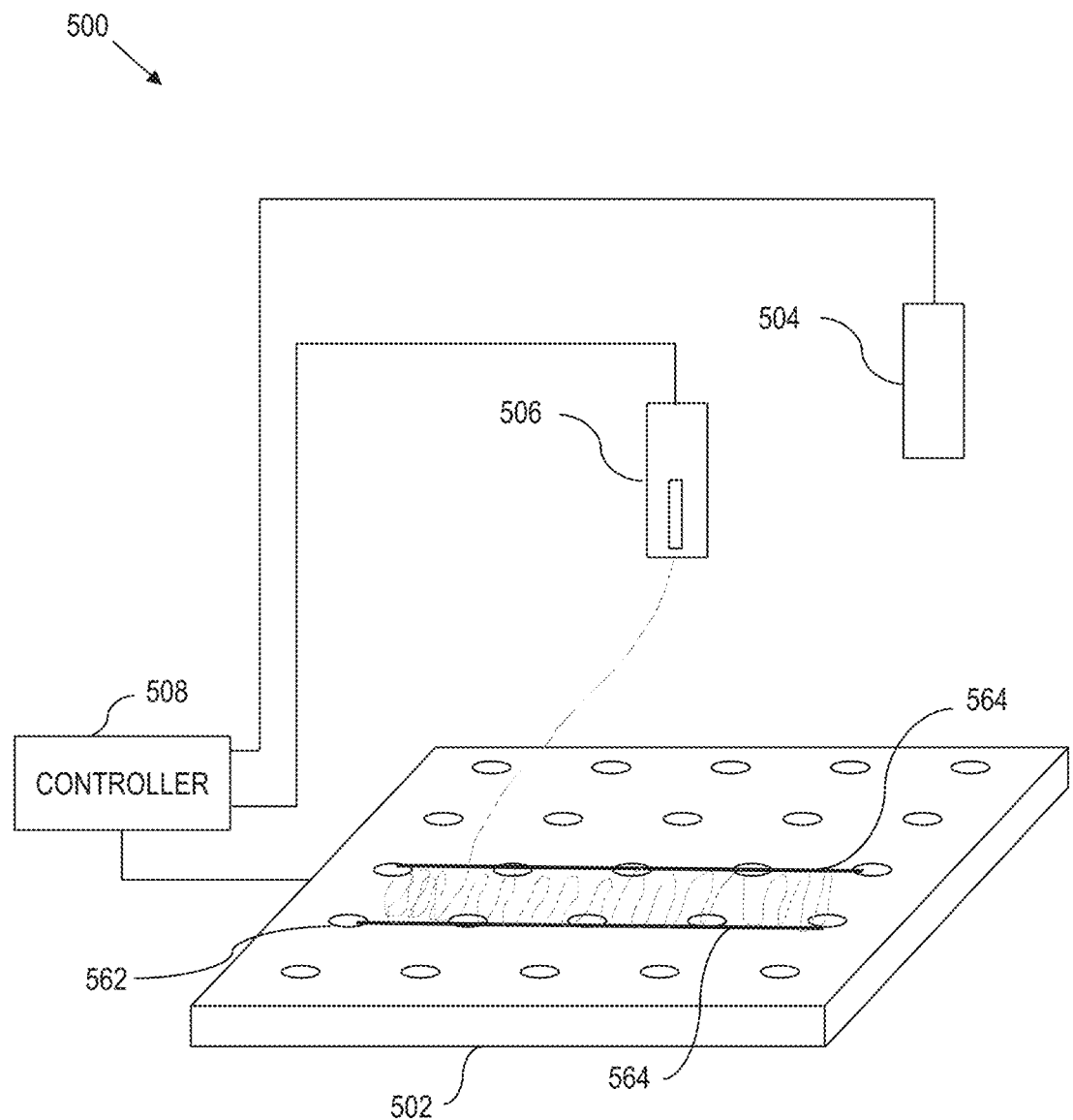
FIG. 5 is a diagram illustrating use of the build plate with pins of FIG. 4, to control placement and shape of electrospun fibers, according to various aspects of the present disclosure.

Referring to FIG. 5, a system 500 is illustrated for creating an object that includes a fiber mesh. The system 500 can be implemented using any combination of features described with reference to the preceding FIGURES. As such, like structure is illustrated with like reference numbers 400 higher than like structure of FIG. 1; 300 higher than like structure of FIG. 2; 200 higher than like structure of FIG. 3, and 100 higher than like structure of FIG. 4. Where like structure is provided, only differences or specific implementations are described for sake of conciseness.

In summary, the system 500 includes a build plate 502, a first device 504, a second device 506, and a controller 508.

In this regard, the system 500 can be implemented in a manner analogous to or identical to the system 400 of FIG. 4.

Here, the difference is that the first device 504, e.g., an additive manufacturing printer, prints a conductive material (such as by extruding GPE) onto the build plate 502 to form a shape that does not form a complete frame. Rather, an example is to form a pair of rails 564. Thus, the difference is the shape of the structure provided by the first device 504. Notably, two separate rails are illustrated for sake of explanation. However, the particular illustrated structures are not limiting. However, each rail must either include a lead to a conductive pin 562 or a lead (not shown) must connect a rail to a conductive pin 562 if the rail is intended to function as a collector for electrospinning.

As with the example of FIG. 4, the second device 506, e.g., an electrospinning device, is positioned or otherwise positionable in operative arrangement with the build plate 502. Once the shape is formed, e.g., using the GPE extrusion, the system 500 uses the shape as a collector to electrospin a fiber structure over the shape (e.g., to form a mesh between the rails as illustrated. Here, the fiber structure can span portions of the shape such that fiber sections are unsupported or unbacked by the shape of the structure. More particularly, the span can form a scaffold, suspended portion, unbacked portion, unsupported portion, or combination thereof.

As with the example of FIG. 4, the process uses a subset of conductive pins 562 to produce a fluctuating electric field by switching the state of certain pins. In FIG. 5, extruded conductive material is placed over certain conductive pins 562. For instance, as illustrated, printed GPE defines a first rail of extruded material defining a conducting pin set A, and printed GPE defines a second rail of extruded material defining a conducting pin set B. While an electrospinning device (e.g., second device 506) produces a thread, an oscillating electric field shapes the thread. For instance, as illustrated, electrospun fiber from an electrospinning syringe tip is aligned between the rails (between conducting pin set A and conducting pin set B). This can be done with conductive pins alone or in combination with the printed conductive layer functioning as a collector. That is, where enough conductive pins 562 are aligned with the shape, the extruded material shape need not be conductive.

Here, the controller is operatively programmed to control individual ones of the conductive pins to be in a selected state, the state of at least one conductive pin affecting control of a deposition from the electric deposition device during operation thereof. As another example, the controller can be operatively programmed to alternate the electrical state of multiple conductive pins in concert so that an electric field is dynamically changed to align electrospun fibers in a specific geometry induced by a specific pattern of conductive pin activation and frequency of the changing of the pattern.

More precisely, the controller alternates the electrical state (+ or − bias, grounded or floating) of multiple pins in concert so that the electric field is dynamically changed to align (parallel, or lattices of specific intersection angles) the electrospun fibers in a specific geometry (i.e., star, cross, hexagon, etc.) induced by the specific pattern of pin activation and frequency of the changing of the pattern (which can be tuned based on the fiber momentum and rheological/mechanical properties to really get the best results).

Notably, the system does not require any moving parts thus making the system robust.

Example Fiber Mesh over Support Built on Non-Conductive Substrate

Figure 6:
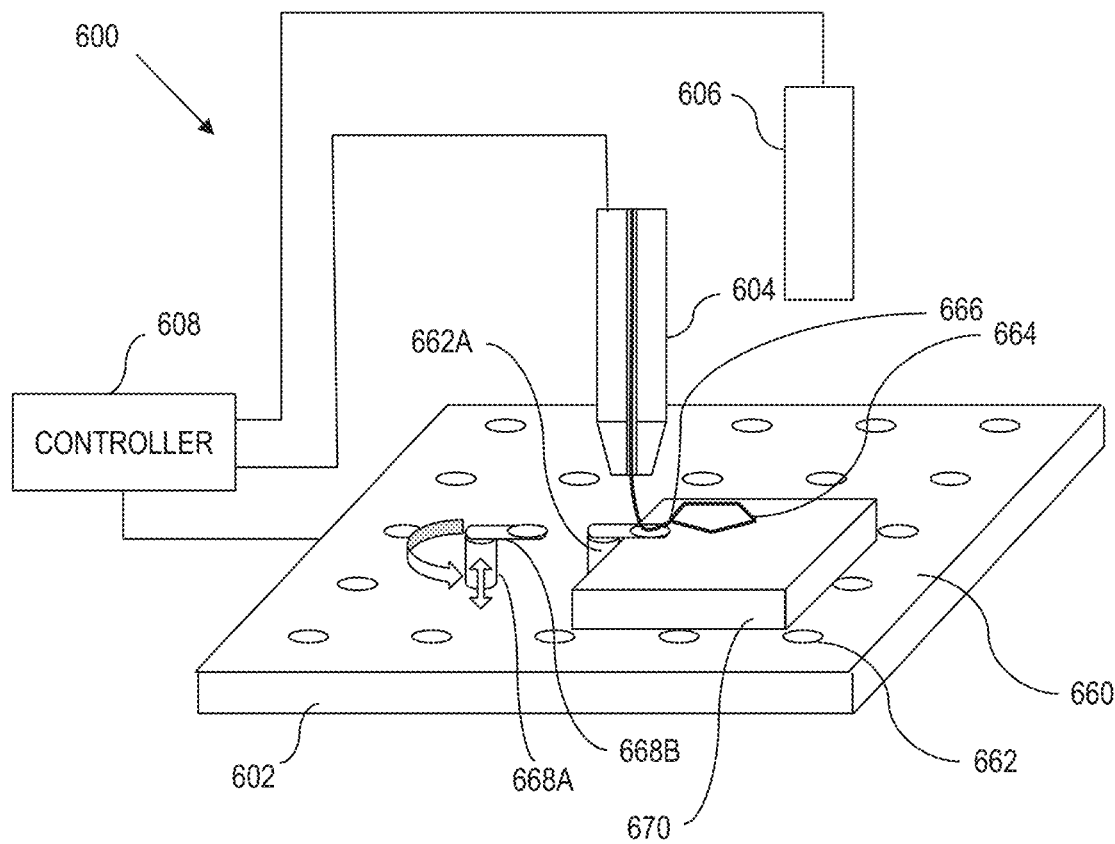
FIG. 6 is a diagram illustrating use of another build plate with pins to control placement and shape of electrospun fibers, according to various aspects of the present disclosure.

Referring to FIG. 6, a system 600 is illustrated for creating an object that includes a fiber mesh. The system 600 can be implemented using any combination of features described with reference to the preceding FIGURES. As such, like structure is illustrated with like reference numbers 500 higher than like structure of FIG. 1; 400 higher than like structure of FIG. 2; 300 higher than like structure of FIG. 3; 200 higher than like structure of FIG. 4, and 100 higher than like structure of FIG. 5. Where like structure is provided, only differences or specific implementations are described for sake of conciseness.

In summary, the system 600 includes a build plate 602, a first device 604, a second device 606, and a controller 608. Moreover, the build plate 602 has a build surface having a non-conductive surface 660 and conductive pins 662 arranged within the non-conductive surface 660. In this regard, the system 600 is analogous to the system 400 of FIG. 4, and thus the preceding discussion with regard to FIG. 4 is adopted for the system 600 of FIG. 6. One difference between the system 400, FIG. 4 and the system 600, FIG. 6 is that the build plate 602 includes pins that can extend from the surface of the non-conductive surface 660.

Build Plate with Movable Conductive Pins

The build plate 602 is analogous to the build plate 402 of FIG. 4. Thus, like elements are represented by like reference numbers 200 higher. The build plate 602 can also be used as an example of the build plate in any of the preceding FIGURES. In this regard, only changes and additional details are described in detail in regard to preceding figures.

FIG. 6 illustrates that one or more conductive pins 662 (which can incorporate any combination of features of conductive pins 462, FIG. 4) may be coupled to a mechanism 668A that allows the associated conductive pin 662 to be raised, lowered, and optionally rotated on an individual basis. Thus, in the illustrated embodiment, at least some of the conductive pins 662 have a state and a position (orthogonal to the surface of the build plate 602).

In yet other embodiments, the mechanism 668A can include an arm 668B that extends the corresponding conductive pin 662 laterally from a longitudinal axis of the mechanism 668A. In this regard, the mechanism 668A defines a center, and the arm 668B defines a segment that allows the corresponding conductive pin 662 to traverse about a circumference defined by the arm 668B relative to the build plate 602. Thus, in the illustrated embodiment, at least some of the conductive pins 662 have a state and a position (both orthogonal and parallel to the surface of the build plate).

Thus, if an insulator 670 is used as a base for an object, a conductive pin 662 can be positioned such that a conductive pad of the conductive pin 662 is seated on the insulator 670. This allows for a shape 664 coupled to a lead 666 to be extruded onto the insulator 670, and the lead 666 can attach to the conductive pin 662.

Here, the height of the insulator 330 is negated by raising the conductive pin 660 and rotating a conductive pad into cooperation with the lead 666. Changing the height of the conductive pins 662 also helps with patterning in a Z dimension (i.e., height) for three-dimensional parts. In practice, any number of pins can be adjustable. Moreover, the adjustability of each conductive pin can be controlled by the controller 608, e.g., via servos, actuators, motors, etc.

Moreover, any number of conductive pins 662 can be positioned on the insulator 670, e.g., depending upon the subsequent electrospinning requirements.

Using the Build Plate with Movable Conductive Pins

The system 600 of FIG. 6 operates analogously to the system 400 of FIG. 4, except that the object is built on an object, which can include an insulator 670.

In summary, the first device 604, e.g., an additive manufacturing printhead, prints a conductive material (e.g., extrudes a gel-polymer-electrolyte (GPE)) onto the build plate 602 to form a shape 664 corresponding to a desired shape of an part to be fabricated via EHD deposition. A lead 666 couples the shape 664 to a specific conductive pin of 662 of the array (e.g., conductive pin 662A as illustrated), which has been positioned on the insulator 670, e.g., via the controller 608.

After the shape has been formed, the system 600 provides a fiber structure over the shape. For instance, controlling the state of the pin 662A coupled to the lead 666, e.g., via the controller 608, while keeping the rest of the pins 662 at a floating, or high bias state or a ground state will cause fibers deposited about the shape 664 during electrospinning.

Thus, the build plate 602 of FIG. 6 can be utilized in the case of more complex devices that may have a three-dimensional architecture. Flexibility of fabrication is provided because the conductive pins 662 (or select conductive pins 662) can be mechanically (or electro-mechanically) actuated to raise and lower. The arm 668B can be implemented as a conductive arm that is insulated except for the tip, exposing a conductive pad, protruding from the end of the arm 668B as shown in FIG. 6, which allows for the connection to be placed over previously printed parts.

In this regard, in some embodiments, one or more conductive pins 662 can raise and lower. In addition to or in lieu of raising and lowering, one or more conductive pins 662 can include an arm so that lateral repositioning of the conductive pin is possible. Notably, the lateral repositioning via rotation of the arm 668B (where implemented), does not require that the conductive pin 662 is raised. This allows dynamic reconfiguration of the array shape for the conductive pins. In some embodiments, the conductive pad of a conductive pin 662 may be repositioned during a manufacturing process, e.g., during electrospinning to precisely control fiber deposition.

As a non-limiting example, the insulator 670 may define a well cup. By placing one or more, e.g., two, four, etc., conductive pins 662 around the perimeter of the well, the second device 606 can electrospin a mesh "cap" over the well opening.

Moreover, as noted more fully herein, the first device 604 can comprise multiple printheads to build the object from different materials. For instance, using the build plate 602, the process of building an object can comprise utilizing a first additive manufacturing head to additively manufacture a first portion of the object, utilizing a second additive manufacturing head for extruding the gel polymer electrolyte over the first portion of the object such that the extruded gel polymer electrolyte is raised from the surface, and utilizing a movable pin to couple the extruded gel polymer electrolyte to an electrical circuit to function as the collector to control the electric field deposition.

As an alternative to a moving conductive pin, the system 600 can integrate a robotic arm that moves a conductive pin, electrode, etc., into position to couple the extruded gel polymer electrolyte to an electrical circuit to function as the collector to control the electric field deposition.

Example Suspended Fiber Mesh Between Supports with Movable Pins

Figure 7:
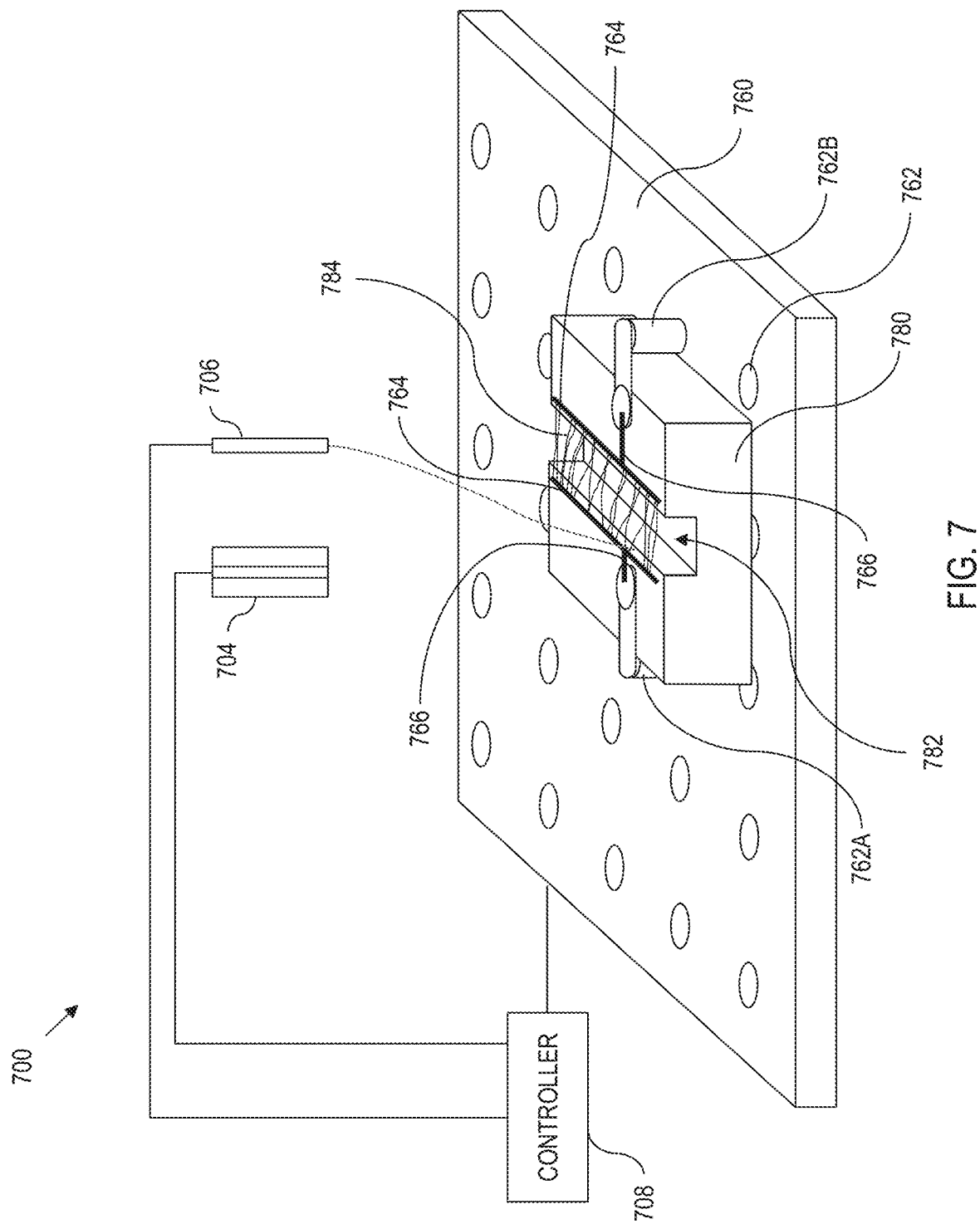
FIG. 7 is a diagram illustrating use of yet another build plate with pins to control placement and shape of electrospun fibers, according to various aspects of the present disclosure.

Referring to FIG. 7, a system 700 is illustrated for creating an object that includes a fiber mesh. The system 700 can be implemented using any combination of features described with reference to the preceding FIGURES. As such, like structure is illustrated with like reference numbers 600 higher than like structure of FIG. 1; 500 higher than like structure of FIG. 2; 400 higher than like structure of FIG. 3; 300 higher than like structure of FIG. 4, 200 higher than like structure of FIG. 5, and 100 higher than like structure of FIG. 6. Where like structure is provided, only differences or specific implementations are described for sake of conciseness.

In summary, the system 700 includes a build plate 702, a first device 704, a second device 706, and a controller 708. Moreover, the build plate 702 has a build surface having a non-conductive surface 760 and conductive pins 762 arranged within the non-conductive surface 760. In this regard, the system 700 is analogous to the system 600 of FIG. 6, and thus the preceding discussion with regard to FIG. 6 is adopted for the system 700 of FIG. 7. For instance, at least two of the conductive pins 762A and 762B are capable of moving, rotating, repositioning, etc., as described more fully with regard to FIG. 6. Moreover, the example is similar to the example of FIG. 5, except that the rails are each set on fabricated structures.

More specifically, the first device 704 includes multiple printheads, for sake of illustration. In this regard, the first device 704 prints, e.g., using an FDM printhead, a lower part of an object 780. The object 780 is to have a channel 782 with a fiber mesh 784 spanning thereacross. As such, the first device 704 uses a second printhead that prints a conductive layer (e.g., an extrusion printhead to extrude a GPE layer over the FDM layer, where the GPE layer defines a shape 764 e.g., a rail) on each side of the channel 782. Each rail is coupled to a respective one of the conductive pins 762A, 762B by a corresponding lead 766.

The second device 706 then electrospins a fiber mesh 784 over the channel. For instance, by alternating the states of the conductive pins 762A, 762B, and hence alternating the states of the leads 766 and rails (shapes 764), the fiber mesh 784 can be controlled and positioned as the application dictates.

The remainder of the build can proceed afterwards, e.g., to continue building with the first printhead (e.g., FDM) of the first device 704 to enclose the fiber mesh 784, etc.

As noted more fully herein, to control the patterning of the fiber mesh, the controller 708 dynamically modulates an output state of each conductive pin, e.g., raised and positioned conductive pins 762A and 762B by varying at least one of voltage, frequency, pulse duration an phase shift. The controller 708 may be further operatively programmed to tune the alternate electrical states based on fiber momentum and rheological/mechanical properties or using any of the techniques set out more fully herein. For instance, the controller 708 can control electric state switching for the conductive pin 762A and the conductive pin 762B by tuning the electric state switching to match a resonant frequency dependent on the properties of electrospun fibers to align fibers with each other in a preferred direction, and to constrain patterning of fibers to a specific area according to a desired fiber geometry.

By changing the electric field (e.g., oscillating, discrete control, etc.) created by the array of pins in the build plate, the build plate functions as a dynamic collector array within a dynamic collector array system.

Ad Hoc Build Plate

As noted above, embodiments herein contemplate using a conductive extrusion to define a shape. In this regard, a formal build plate is not required, such as where a power supply can be connected to the shape for purposes of using the shape as a collector. For instance, an extrusion gun can be used to extrude a GPE structure onto a surface, e.g., a wall, door, floor, object, etc. The GPE structure is temporarily coupled to a power supply (e.g., in the case of electrospinning), and a fiber mesh is deposited over the structure. This allows "build in place" structures to be created. For instance, by printing a nano or micro fiber mesh over a surface, tamper detection can be implemented. For instance, a fiber mesh can be created that is too small to see. However, if a structure is created that bridges the door to its frame, then once the door is open, the fibers will break evidencing tampering.

Example Ad-Hoc Fiber Mesh Object

Referring to FIG. 8, a system 800 is illustrated for creating an object that includes a fiber mesh. The system 800 can be implemented using any combination of features described with reference to the preceding FIGURES. As such, like structure is illustrated with like reference numbers 700 higher than like structure of FIG. 1; 600 higher than like structure of FIG. 2; 500 higher than like structure of FIG. 3; 400 higher than FIG. 4, 300 higher than like structure in FIG. 5, 200 higher than like structure in FIG. 6, and 100 higher than like structure in FIG. 7. Where like structure is provided, only differences or specific implementations are described for sake of conciseness.

In this embodiment, there is no formal build plate. Rather, the system includes a first device 804 and second device 806.

Analogous to the example embodiments of FIG. 4-FIG. 7, the first device 804 can be used to deposit structure. For instance, as illustrated, a shape 864 of a conductive material is formed on a surface 870, e.g., using GPE or other conductive layer as described more fully herein. The surface 870 can be any non-conductive surface. Note that a lead is not required in this example embodiment. As noted previously, an example way of constructing the shape 864 is to extrude a GPE structure on to the surface 870.

To spin the fiber mesh over the shape 864, an electrospinning syringe tip 870 of the second device 806 is brought into working relationship with the shape 864.

An operatively controlled insulated conducting lead 872 functions as an alternative to pin system of the build plates previously described. Basically, the tip of the lead 872 is exposed to make electrical contact with the GPE shape 864.

The operatively controlled insulating conducting lead 872 can be fixed in relation to the electrospinning syringe tip (spinneret) 870 whereby the lead 872 is brought in to contact with the GPE. This can be accomplished by moving the shape 864 to the lead 872 or moving the lead 872 to the shape. The combination of the lead 872 and GPE shape 864 cause the shape 864 to function as a collector for electrospinning by the second device 806. This allows a fiber 874 to form over the shape 864.

Outside of an additive manufacturing system, the GPE may be extruded onto surfaces in an environment (wall, body, wound), upon which the lead may be manually placed to create an object with a fiber mesh.

Controller—Control Sequence

As noted more fully herein, to solve the problem of highly ordered polymer fibers stacking, an approach is provided that manages the electric field configuration in the electrospinning space (as opposed to modifying the electrode).

In example embodiments, the controller (108, FIG. 1; 208, FIG. 2; 308, FIG. 3; 408, FIG. 4; 508, FIG. 5; 608, FIG. 6; 708, FIG. 7) is coupled to a build plate (where provided), the first device (e.g., the additive manufacturing device), the second device (e.g., the electrospinning device), or combinations thereof. Moreover, the controller is operatively programmed to control the additive manufacturing device to print a shape of a desired frame and other object structure. In embodiments using a build plate such as that illustrated in FIG. 2-FIG. 7, the controller can control the location of the shape on the build platform such that the shape of the desired structure touches and extends from a select conductive pin or pins of the build plate defining a lead. The controller is further operatively programmed to control the second device, e.g., to print a fibrous or membrane structure onto the build plate or otherwise over the shape of the object already built on the build plate, e.g., by dynamically controlling individual ones of the conductive pins to be in predefined states, at least one controlled conductive pin comprising the select conductive pin defining the lead.

In some embodiments, the controller implements a control sequence that facilitates electrospinning for controllable fiber alignment and deposition on a dielectric substrate by electric field manipulation using, for example, nanosecond rise time high-voltage pulse generators. Here, fast changing electric field configuration in the interelectrode region, in combination with strictly defined electrode potentials results in fiber deposition point control.

By way of example, the controller according to a working embodiment, can provide the ability to set interelectrode voltage from 0 volts to a voltage potentially in the kilovolt range. Example frequency switching can range, for example, from 0 to 50 kHz, duration of high-voltage pulse of 300 ns to infinity, peak current up to 160 A. Due to potentially requiring a high pulse current, the approaches herein allow obtaining oriented materials on long collectors with multiple syringes for industrial production.

The controller can thus include for example, a high voltage direct current (DC) source or bank of DC supplies, that couples DC power to the pins of the build plate. A control circuit electrically controls the supply (or supplies) to programmably control a state thereof, e.g., by varying frequency, pulse duration, polarity, state, phase shift, combination thereof, etc., via the control of a control processor.

Observations

Referring to the FIGURES generally, initially, it should be noted that the features disclosed in the various embodiments can be combined in any manner and in any order. For instance, the build plate 402 of FIG. 4, or the build plate 602 of FIG. 6 can be utilized with the process of FIG. 2 or the process of FIG. 3 (or aspects thereof), etc. Likewise, the build plate 202 of FIG. 2 can be used as the build plate for the process (or aspects thereof) in any of FIG. 3-7, etc. Moreover, other materials can be used for the structure. In this regard, the requirements for the overall object will likely dictate the required material properties. Moreover, a build plate is not strictly required as illustrated in FIG. 8. Here, an embodiment like that of FIG. 8 can use techniques, controls, components, processes and aspects as desired from the disclosure of any preceding FIGURE or combination of FIGURES.

Moreover, the fiber can be nanoscale, microscale, or larger. Yet further, the fibers, droplets, membrane, etc., can be formed using other materials, again which may be dictated by the specific application.

In some embodiments, multiple conductive pins may also be used to produce fluctuating electric field by switching/alternating the state (positive/negative/grounded/floating) of select conductive pins, e.g., via the controller. This can be done with conductive pins alone or in combination with the gel polymer electrolyte patterns (e.g., shape)). The frequency of electric state switching can be tuned to match a 'resonant' frequency dependent on the properties of electrospun fibers including material density, elastic modulus, fiber thickness, voltage, velocity, momentum, the distance between points/pins, combinations thereof, etc. This phenomenon can be exploited to align fibers with each other in a preferred direction, and to improve patterning of fibers to a specific area as well as create novel fiber geometries.

Aspects herein provide systems and processes for electrospinning directly onto insulated or dielectric materials and in user defined geometries. Aspects herein also enables unique patterning modalities through oscillating electric-fields imparted by the disclosed 'dynamic collector array' (e.g., conductive pins controlled by controller based upon state and optionally position. Yet further, aspects herein improve over prior art utilizing mask/plasma/patterning of electrolyte fluids by having few steps, allowing more facile inclusion in additive manufacturing processes, and being more resistant to evaporation.

Electrospun nano-fiber mats have been demonstrated to provide advantages over traditionally etched micro-pore membranes as substrates for cell culture, especially bilayer cultures modeling barrier tissues. Many other applications of electrospun fibers, electrospun fiber mats, electro-spraying and more widely electric-field-driven patterning of solutions, chemicals, (nano)particles, cells, fibers, beads or micro-devices can also benefit from this process. However, nanofiber mats can be very delicate and are not amenable to typical modes of attachment like ultrasonic welding.

Heat sealing can be implemented, but the process requires a multi-step process, electrospinning nanofiber mats, dethatching mats, cutting mats, aligning mats, and heat sealing via manual targeted application of heat. This inefficient manual process yields high labor costs and poor uniformity and has limited commercial adoption of electrospun fiber membranes in tissue chips.

To the contrary, by using aspects disclosed herein, e.g., multiple pairs or sets of pins of conductive pins on a build plate, even with different axis it is possible to create complex, highly ordered lattices not possible with conventional electrospinning alignment techniques. These patterns and lattices can impart new properties and functionality into fiber mats (including nano-fiber mats) such as flow, filtration, light polarization, and advanced anisotropic mechanical properties for sensing and actuating.

As noted more fully throughout, techniques herein can be used to fabricate devices such as polymer/plastic cell-culture devises, three-dimensional (3D) printed biochips and tissue engineering scaffolds, etc. For example, if the device to be fabricated is a cell-culture device, then a biodegradable material or a biocompatible material can be used (e.g., calcium alginate).

Moreover, the techniques herein are also applicable to any electric-field-driven deposition technique, and as such, the intended purpose is not limited to medical applications such as cell culture devices.

For instance, electro-spray can be used to fabricate electrochemical devices like sensors, electrodes (e.g. batteries) light emitting devices as well as filters and porous polymers, even cells. The wide applicability of systems and processes herein is due, at least in part, to the wide selection of materials with different properties that can be used. For example, fibers may be conductive, piezoelectric, light producing, anti-microbial, or degradable. With the build plate and processes described herein, degradable fiber mats can be created to be used as environmental (water, air) sampling method which can then be degraded and analyzed within a fluidic device.

Embodiments herein provide a way to electrospin directly to user defined areas on a device in as few as two steps. For instance, in an example embodiment, a conductive layer is provided (e.g., a gel-polymer-electrolyte (GPE) solution is printed via extrusion pen) onto a non-conductive surface in a geometry defining the perimeter of the desired shape on the device. In the case of a cell-culture device, the GPE can be a biocompatible or biodegradable materials such as Calcium Alginate. For other applications it needn't be limited to this constraint. Next, a 'lead' is printed connecting this geometry to a conductive pin on the dynamic collector array (any of the build plates with conductive pins, as described more fully herein). This pin is one of an array of pins/electrodes in the substrate which can be selectively enabled, (i.e., connected to ground, or voltages source) via a programmable electronic switch board (e.g., a controller). The pins can also be motorized/mechanized so as to raise and lower, rotate etc., allowing the un-insulated tip (for advanced shapes) to be placed in close proximity (in three dimensions) to the area of desired material deposition. All this is to reduce the length of the conductive 'lead', e.g., to reduce undesired accumulation of fibers along the lead.

Mechanical movement of 'pins' allows for pattering at various Z-dimensions as per a 3D device. The dynamic selective grounding allows for "activation" of only a single, or sub-set of electrodes to be grounded at any one time, so that several geometries can be patterned per the previously described process in series (or parallel with advanced device configurations). The 'dynamic collector array' allows an additional advantage in that it enables an entire second modality to electric field driven deposition.

By alternating activation (both grounding and/or voltage) adjacent (or just different) pins, subsets of pins, and/or pin-conductive layer patterns, the electric field itself can be driven to oscillate. The frequency and amplitude of this oscillation can be tuned to 'resonate' with the mechanical characteristics of the fiber (i.e. mass, momentum, length, elastic modulus) to influence the direction and redirection of fiber orientation (or particle polarity, e.g. magnetic or electric dipole). This can be a useful and flexible technique without the printed GPE. In combination it can allow for experimentation and empirical tuning of these parameters without labor intensive redesign and fabrication of novel electrode geometries, as GPE-printed electrodes can be printed on the fly as easy as common 3D, or even 2D printing.

Aspects herein enable electrospinning filters with high air permeability, low dispersion of pore sizes, and small pore sizes for filtering applications. For biological sensor applications, aspects herein enable the electrospinning of controlled material surface areas for biological sensors for small concentration reception of detectable substances. Adjustable fiber morphology can increase the packing density and, correspondingly, the surface area while maintaining the sensor dimensions. Thus, the systems, processes, and devices disclosed herein can be used to create a range of devices. For example, embodiments of the build plate that functions as both a build plate and a collector described herein can be used to fabricate cell culture devices, biochips, lab-on-chip and other devices which benefit from the inclusion, integration, or both of electrospun fibers and mats as enabling components including but not limited to sensors, actuators, transducers (e.g., light-emitting diodes (LED)), cells, tissue scaffolds, filters, electrodes, and immobilization lattices.

The build plates described herein allow for a new method to integrate and target electrospun fibers into non-conductive devices. This new method enables not only integration into devices but easy integration into device fabrication process and platforms, reducing multi-step and manual processes. The processes described herein do not require manipulation and attachment/integration of separately spun fibers which are delicate and difficult to handle.

The systems, processes, and devices disclosed herein allow for electrospinning and other electric-field-driven deposition techniques to be used with non-conductive substrates and devices. Further, they enable integration with additive manufacturing platforms without manual labor and reduce wasted product by electrospinning to only the precisely defined areas. Also, the systems, processes, and devices disclosed herein do not require fabrication of a mask or plasma.

Yet further, embodiments herein require only a few steps and can be executed as easily routine direct write (DW) extrusion 3D printing. Also, embodiments herein allow for multi-site/multi-step deposition through the 'dynamic collector array' described more fully herein, which enables new modes of electric field modulated patterning.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but are not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:
1. A process for creating an object, comprising:
depositing a mat on a substrate, the depositing comprising at least one of:
forming a fiber mat by at least one of electrospinning at least one fiber, or melt blowing at least one fiber; or
electrohydrodynamic spraying a membrane layer to define the mat as a membrane mat;
using a controller to perform a fused deposition modeling process to print a frame by positioning a structure over at least a portion of the mat to define an object that comprises at least a portion of the mat being suspended between members of the frame; and removing the object such that a first portion of the mat removed with the object is bonded to the structure and a second portion of the mat removed with the object is unsupported by the structure.

2. The process of claim 1, further comprising utilizing an additive manufacturing process to deposit the structure over the mat so that the structure bonds with the mat.

3. The process of claim 1 further comprising:
inverting the object;
repositioning the object on the substrate; and
bonding another section of mat to the object.

4. The process of claim 1, wherein the object is a fluidic device, a lab-on-chip device or a cell culture device.

5. The process of claim 1, wherein the fiber mat comprises nanofibers.

6. The process of claim 1, wherein the substrate comprises a build surface.

7. The process of claim 1, further comprising, prior to the step of depositing the mat, additively manufacturing a base support structure to define the substrate such that depositing the mat on the substrate comprises directly depositing the mat onto the base support structure.

8. The process of claim 7, wherein the additive manufacturing of the base support structure is performed by an extrusion-based additive manufacturing process.

9. The process of claim 8, wherein the extrusion-based additive manufacturing process comprises fused deposition modeling.

10. The process of claim 8, wherein the extrusion-based additive manufacturing process comprises an extrude and cure process.

11. The process of claim 8, wherein the base support structure defines a bottom surface, a top surface and a plurality of sidewalls extending between the bottom and top surfaces, the top surface defining a channel therein with a fiber mesh spanning thereacross.

12. The process of claim 11, wherein the frame extends between the plurality of sidewalls.

13. The process of claim 12, wherein the frame forms a top layer that at least partially encloses the void to form a chamber.

14. The process of claim 7, wherein the base support structure is formed from a first material and the printed frame is formed from a second material.

15. The process of claim 14, wherein, the first material and the second material are made from the same polymeric material.

16. The process of claim 14, wherein, the first material and the second material are made from different materials.

17. The process of claim 7, wherein depositing the mat comprises electrospinning at least one fiber, and the process further comprises, prior to the electrospinning, additively manufacturing a conductive material onto the base support structure to facilitate the electrospinning of the at least one fiber.

* * * * *